Patented June 19, 1945

2,378,571

UNITED STATES PATENT OFFICE 2,378,571

POLYCONDENSATION PRODUCTS

Otto Moldenhauer and Helmuth Bock, Hirschberg, Riesengebirge, Germany; vested in the Alien Property Custodian No Drawing. Application March 12, 1941, Serial No. 383,037. In Germany July 21, 1939

5 Claims. (Cl. 260—2)

This invention relates to improved polycondensation or polymerization products and method for producing the same, and more particularly to such products having hydrazine dicarboxylic acids or their derivatives as a base.

An object of this invention is the production of a novel polycondensation or polymerization product suitable for the formation of artificial fibers.

Another object of the invention is the production of an artificial material from hydrazine dicarboxylic acids or their derivatives.

A further object of this invention is the production of an artificial material by the polymerization of hydrazine dicarboxylic acids or their derivatives.

A still further object of this invention is the production of an artificial material by polymerizing the reaction products of hydrazine dicarboxylic acids or their derivatives with derivatives of dicarboxylic acids.

Other objects will be pointed out with more particularity in the description outlined hereinafter.

Generally speaking, the subject matter of the present invention is based upon the discovery that a polymerization product well adapted for the production of fibers and films without the presence of aliphatic or other organic chain members can be produced by the pure or mixed self-condensation of hydrazine carboxylic acids or their derivatives. These derivatives may include not only the esters, chloride and diamides, but also the amidohydrazides and the dihydrazides.

As an example of the foregoing, if one takes hydrazine dicarboxylic acid diamide, which may be produced in a known manner either from hydrazine and potassium cyanate or hydrazine and urea, and heats this in a vacuum, a vigorous development of ammonia takes place and simultaneously a viscous melt is produced which permits itself to be further polymerized until it becomes extremely well adapted for the production of fibers. The course of this reaction is substantially as follows:

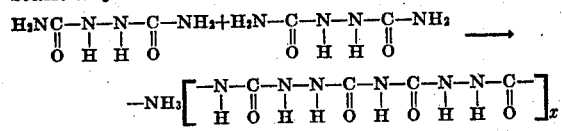

The invention also contemplates reacting hydrazine dicarboxylic acids with one of its derivatives and polymerizing the reaction product. For example, if an ester of hydrazine dicarboxylic acid is reacted with a further molecule of hydrazine dicarboxylic acid diamide, alcohol is given off and the resulting product may be polymerized to form a melt having strong fiber forming characteristics. This reaction takes place in accordance with the following:

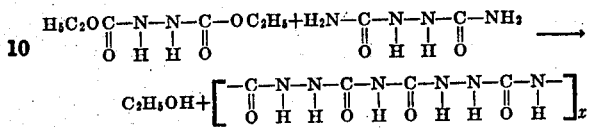

The products so produced show more or less large hydrophile characteristics which indicate also that hydrazo dicarboxylic acid derivatives can be combined with derivatives of dicarboxylic acids. Accordingly, by the action of hydrazo dicarboxylic diamide upon adipinic acid anhyride a condensation product is produced which also has good fiber forming characteristics. Another example of this is shown by the reaction of hydrazo discarboxylic amide with dicarboxylic diamide which, upon the splitting off of ammonia produces condensation products extremely suitable for the production of water-insoluble fibers, films and the like. The course of the reaction is similar to that of the above self-condensation products.

As further examples of the method in accordance with the present invention, there may be suggested the polymerization of an equimolecular mix of hydrazine dicarboxylic acid diamide and hydrazine dicarboxylic acid ethyl ester, or an equimolecular mix of hydrazine dicarboxylic acid diamide and the anhydride of a dicarboxylic acid, or a mix of hydrazine dicarboxylic acid diamide with the amide of a dicarboxylic acid.

In all cases the polymerization is effected by methods in themselves known, including the steps of initiating the polymerization under pressure and ending it without pressure or in a vacuum; the end point of the polymerization can be fixed by the addition of an excess of one of the reaction components either at the beginning or during the course of the reaction, or by a sudden cooling of the reaction mass.

The completed reaction mass is worked into fibers or films in a manner also known to the art, and it is also contemplated that suitable solvents, softening, matting or coloring materials may be added to the reaction mass as desired.

Several specific examples of the methods contemplated by and encompassed within the scope of the present invention are herewith given by way of example:

Example 1

Fifty-nine parts by weight of hydrazo dicarboxylic diamide and one hundred parts by weight of sebacic acid diamide are heated in an autoclave for three hours to 190° C. to 200° C. After this has cooled off a strong ammonia pressure is present within the autoclave. The reaction product is then condensed in a vacuum. After a four-hour heating to 230° C. there is produced a plastic mass which possesses good fiber-forming characteristics and can be molded very easily. It is insoluble in the usual solvents and its softening point lies at 98° C.

Example 2

One hundred parts by weight of hydrazo dicarboxylic diamide are heated as quickly as possible in a good vacuum to 290° C. in a reaction chamber provided with a condenser. After the reaction has continued for four hours there will be produced a vitreous product with good plastic characteristics. Urazole produced in slight amounts during the course of the reaction will be found in the condenser.

Example 3

One hundred and eighty-four parts by weight of sebacic acid anhydride are intimately mixed with one hundred and twenty parts by weight of hydrazo dicarboxylic diamide and quickly heated to 290° C. When this temperature has been reached the reaction chamber is evacuated and the mass condensed for four hours. The condensation product is bright and transparent and can readily be molded at a temperature of above 165° C.

Example 4

One hundred and eighty parts by weight of hydrazo dicarboxylic acid di-ethyl ester and one hundred and forty-four parts by weight of adipinic acid diamide are heated in an autoclave for ten hours at 235° C. in the presence of a slight amount of sodium alcoholate. The alcohol formed is distilled off and the mass condensed for four hours at a pressure of one millimeter of mercury. The condensation product can be very readily molded and is insoluble in the usual solvents.

While certain general and specific examples of the present invention have been given above, all of which satisfy the objects primarily stated, it is to be understood that the invention is not limited thereto except as is required by the claims which follow.

We claim:

1. In a method of producing a polycondensation product, the steps of reacting under pressure at an elevated temperature the diamide of hydrazine dicarboxylic acid with the diamide of a dicarboxylic acid of the class consisting of adipic and sebacic acids, and driving off the separated ammonia at an elevated temperature to such an extent that a melt is produced capable of being drawn into fibers.

2. The method of producing a polycondensation substance which comprises heating hydrazine dicarboxylic diamide and sebacic acid diamide under pressure for three hours at approximately 190° C., cooling, removing ammonia vapors, and heating the mass in a vacuum at approximately 230° C. for about four hours.

3. An artificial material suitable for the formation of fibers and films comprising the condensation product of a substance selected from the group consisting of the diesters and diamide of hydrazine dicarboxylic acid with the diamide of an acid selected from the group consisting of adipic and sebacic acids said product being formed by heating the reactants under superatmospheric pressure and by further heating at no more than atmospheric pressure until a fiber forming polymer of high molecular weight is produced.

4. An artificial material suitable for the formation of fibers and films comprising the condensation product of a substance selected from the group consisting of the diesters and diamide of hydrazine dicarboxylic acid with the diamide of adipic acid said product being formed by heating the reactants under superatmospheric pressure and by further heating at no more than atmospheric pressure until a fiber forming polymer of high molecular weight is produced.

5. An artificial material suitable for the formation of fibers and films comprising the condensation product of a substance selected from the group consisting of the diesters and diamide of hydrazine dicarboxylic acid with the diamide of sebacic acid said product being formed by heating the reactants under superatmospheric pressure and by further heating at no more than atmospheric pressure until a fiber forming polymer of high molecular weight is produced.

OTTO MOLDENHAUER.
HELMUTH BOCK.